(12) United States Patent
Meckert et al.

(10) Patent No.: US 7,093,781 B2
(45) Date of Patent: Aug. 22, 2006

(54) PROCESS AND APPARATUS FOR MANUFACTURING POWDER RUBBER

(75) Inventors: George W. Meckert, New York, NY (US); Peter J. Waznys, Centerport, NY (US); Anthony M. Cialone, Garden City, NY (US)

(73) Assignee: Lehigh Technologies, LLC, Garden City, NY (US)

( * ) Notice: Subject to any disclaimer, the term of this patent is extended or adjusted under 35 U.S.C. 154(b) by 11 days.

(21) Appl. No.: 10/973,848

(22) Filed: Oct. 26, 2004

(65) Prior Publication Data

US 2006/0086839 A1   Apr. 27, 2006

(51) Int. Cl.
*B02C 19/12* (2006.01)

(52) U.S. Cl. ............... 241/23; 241/24.17; 241/65; 241/DIG. 31; 241/DIG. 37

(58) Field of Classification Search ............... 241/23, 241/24.17, 24.27, 65, 79, DIG. 31, DIG. 37; 521/41
See application file for complete search history.

(56) References Cited

U.S. PATENT DOCUMENTS

| | | | | |
|---|---|---|---|---|
| 4,025,990 A | * | 5/1977 | Lovette, Jr. | 241/14 |
| 5,385,307 A | * | 1/1995 | Azar | 241/41 |
| 5,735,471 A | * | 4/1998 | Muro | 241/23 |
| 5,927,620 A | * | 7/1999 | Memon | 241/17 |

* cited by examiner

*Primary Examiner*—Mark Rosenbaum
(74) *Attorney, Agent, or Firm*—Scully, Scott, Murphy & Presser, PC

(57) ABSTRACT

A process and apparatus for making crumb and powder rubber from preprocessed rubber particles. The process and apparatus provides an energy efficient operation wherein the preprocessed rubber particles are dried, precooled, frozen, comminuted and sized using a closed cryogenic fluid cycle.

23 Claims, 2 Drawing Sheets

PROCESS AND APPARATUS FOR MANUFACTURING POWDER RUBBER

BACKGROUND OF THE DISCLOSURE

1. Field of the Invention

The present invention is directed to a process and apparatus for making powder rubber from recycled used rubber sources. More specifically, the present invention is directed to a process and apparatus for making powder rubber from a preprocessed source of used rubber particles having different average particle size ranges.

2. Background of the Prior Art

It is long been known that the disposal of used tires and other rubber articles represents a major environmental problem insofar as used tires overwhelm waste disposal sites and indiscriminate discarding of tires and like rubber articles create major environmental problems. It is for this reason that processes have been developed to dispose of tires in a manner that not only eliminates them as an environmental problem but provides incentives for practice of those tire disposal processes.

Early processes focused upon tire comminution which recovered the inherent fuel value of the significant combustible content of vehicle tires. More recently, processes which recover the rubber constituent of vehicle tires, for reuse in the manufacture of rubber-containing articles, have been developed.

Although these processes have encouraged environmental protection by providing processes for the utility of rubber in the further manufacturing of new rubber products, a major concern associated with these processes has been the inability to provide purchasers of the rubber products produced by these processes with a rubber material that can be readily incorporated into the purchaser's production feed. That is, randomness of comminution variables and the types and condition of the used vehicle tire feed have produced random rubber products. Probably, the most undesirable result of this random production has been the unpredictable rubber product particle size distribution. That is, although a lively market exists for powder rubber this market has not yet been fully exploited due to difficulties in producing commercial quantities of powder rubber in the particle size ranges required by tire and other rubber product producers, the target purchasers of powder rubber products.

The inventors of the present application have addressed this concern with a new process and apparatus embodied in U.S. patent application Ser. No. 10/714,782 filed Nov. 17, 2003.

Other related prior art includes U.S. Pat. No. 5,588,600. The '600 patent describes a process and apparatus for low temperature comminution of tires in which cryogenic fluids, employed in embrittling used rubber particles so that comminution can effectively occur, are recycled. This process produces of a sufficiently small particle size desirable to tire and other rubber product manufacturers. However, even the process and apparatus of the '600 patent provides no assurance that the cryogenic comminuting device can accommodate all rubber particle size feedstocks to produce particles in the powder rubber size range.

Other disclosures of processes and apparatus for reducing rubber to fine particle size include U.S. Pat. Nos. 5,368,240 and 4,863,106.

The above-discussed processes and apparatus address conversion of used rubber products into crumb or powder rubber utilizing comminuting techniques, in combination with the use of cryogenic fluids. What has not particularly been addressed in the development of the above-mentioned technology is the production of powder rubber from used rubber sources in an energy efficient manner. This is particularly important in view of the recent dramatic increase in petroleum costs.

This is also a disguised environmental concern. The higher cost of energy makes the cost of recovering powder rubber significantly more expensive. Unless the price of powder rubber is cost effective, rubber product manufacturers, especially tire manufacturers, will elect to employ virgin rubber. Without this market, there is insufficient incentive to produce these products with the resultant environmental problem of disposing of the ever increasing quantity of used tires.

BRIEF SUMMARY OF THE INVENTION

A process and apparatus has now been developed which provides crumb and powder rubber in a predictable particle size range even from disparate used rubber sources in concentrations that permit tire and other rubber producers to utilize such powder rubber in commercial production of tires and other rubber products. This process and apparatus additionally provides an energy efficient process with consequent assurance of the maintenance of competitive advantages to the utilization of used rubber in the form of powder rubber in the production of new rubber products.

In accordance with the present invention a process for producing powder rubber from used rubber products is provided. In this process preprocessed rubber particles of predetermined particle size range are dried. The dried rubber particles are thereupon precooled with an inert gas at a temperature no greater than about 0° F. The precooled rubber particles are thereupon frozen to below their glass transition temperature by exposure to a cryogenic liquid. The rubber particles are next subjected to controlled comminution in which the degree of comminution is a function of the average size of the rubber particles charged into the comminution device.

In further accordance with the present invention an apparatus for producing crumb and powder rubber having a predetermined particle size range is provided. The apparatus includes drying means for drying a feedstock of preprocessed used rubber particles of predetermined particle size range. The apparatus includes precooling means for precooling the dried rubber particles, employing an inert gas coolant at a temperature no higher than about 0° F. The apparatus is provided with freezing means for freezing the precooled rubber particles to a temperature below the glass transition temperature with a cryogenic liquid. The apparatus includes variable comminuting means for comminuting different predetermined particle sized rubber particles feedstocks into crumb or powder sized rubber.

BRIEF DESCRIPTION OF THE DRAWINGS

The present invention will be better understood with reference to the accompanying drawings of which

DETAILED DESCRIPTION

Figure 1:
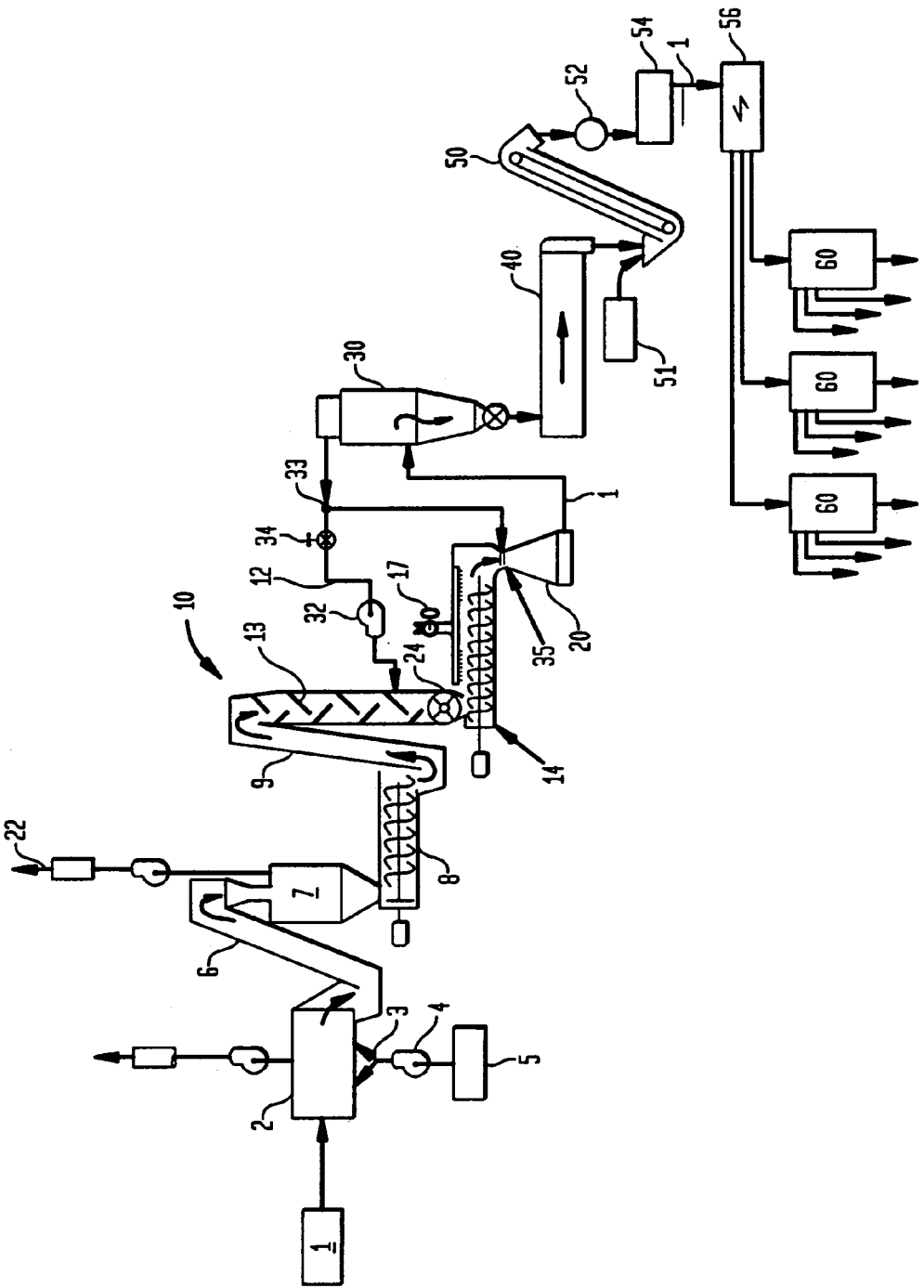
FIG. 1 is a schematic flow diagram of the process and apparatus of the present invention.
Figure 2:
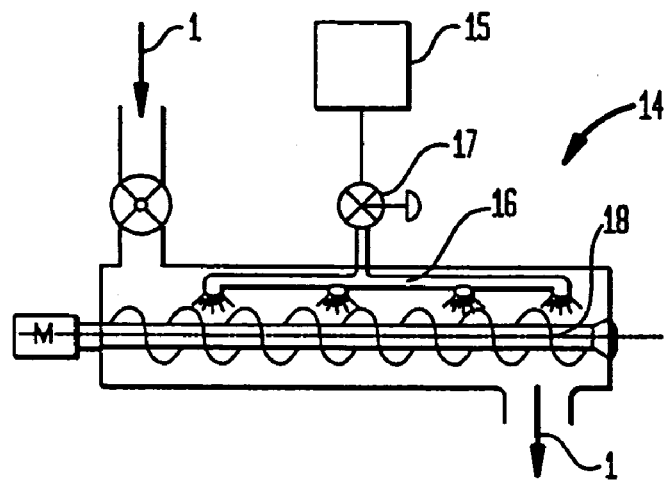
FIG. 2 is a schematic representation of the feedstock freezer.
Figure 3:
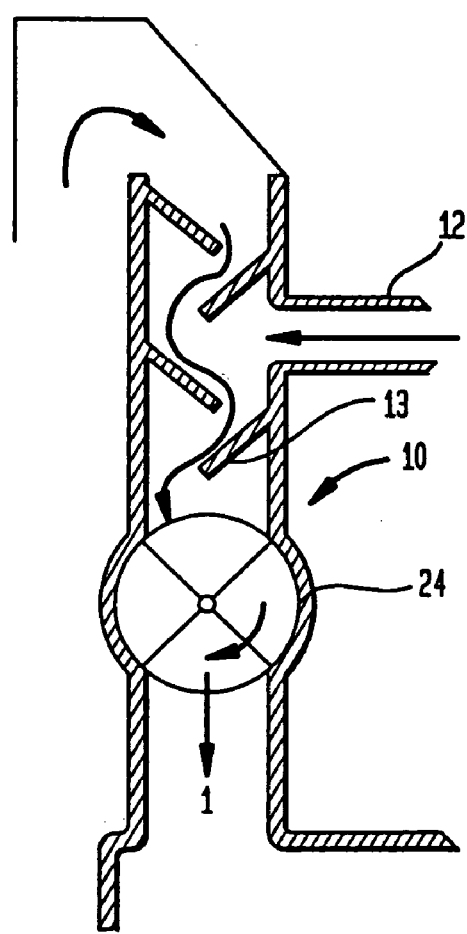
FIG. 3 is a schematic representation of the feedstock precooler.

The used rubber employed in the process and apparatus of the present invention is in the form of rubber particles that have been processed to remove most of the metal and fibers with which they blended to produce tires and other rubber products. The rubber particles have an average particle size in the range of about ⅜ inch to +40 mesh. This rubber particle feedstock is denoted in FIG. 1 by reference numeral 1.

In view of the processing of the rubber particle feedstock prior to the processing of the present invention, the term "preprocessed feedstock" may be used. It is emphasized that this preprocessing is not part of the present invention. In addition, the fact that the preprocessing provides a known particle size range does not indicate that comminution to crumb and powder rubber is predictable. Each feedstock lot is in the range of between about –⅜ inch to +40 mesh. However, within this size range feedstock may vary with each delivery to the processing site where the process and apparatus of the present invention takes place.

The rubber particles feedstock 1 is introduced into a dryer 2. The dryer 2 is preferably a fluidized bed dryer wherein a vibrating table fluidizes the particles of feedstock 1 with hot combustion gas which is blown through perforations, by means of a blower 4, to fluidize the particles. The hot combustion gas 3 is the combustion product of a fuel, preferably natural gas, mixed with air that is burned in furnace 5.

Drying means other than the aforementioned preferred fluidized bed dryer may be utilized. For example, a rotary drum dryer, into which hot combustion gases is introduced, can alternatively be utilized.

This drying step, employing drying means, provides a significant energy savings over processes of the prior art for making crumb and powder rubber. The removal of moisture, effectuated in this step, reduces subsequent energy requirements in downstream cooling steps wherein the rubber particles are cooled to below their glass temperature. The energy associated with freezing and unfreezing ice, as well as raising and lowering the temperature of surface water, to ambient is quite significant given the high latent and sensible heat of water.

In a preferred embodiment of the drying step the combustion product gases contact the rubber particles at a temperature in the range of between about 100° F. and about 200° F. More preferably the drying step is conducted at a temperature in the range of between about 125° F. and about 175° F. Still more preferably, the drying step occurs at a temperature in the range of between about 140° F. and about 160° F.

The dried rubber particle feedstock is conveyed, by solid particle conveying means, which in a preferred embodiment is a bucket elevator 6, to a storage or holding receptacle 7. In a preferred embodiment the storage receptacle is a storage bin 7. It is emphasized that the storage receptacle, whether storage bin 7 or other receptacle, is closed. Indeed, the entire process and apparatus occurs in a closed continuous operation. Coolant gas, described below flows into bin 7. This gas must be entered. Venting occurs by means well known in the art and is illustrated at 22. Insofar as the coolant gas may be reliquified, means for recycling this gas, as described in U.S. Pat. No. 5,588,600, incorporated herein by reference, may be provided.

The dried rubber particles 1 are conveyed from the storage bin 7 by means of suitable variable speed conveyor mechanism means 8, to a precooling means. In a preferred embodiment, illustrated in the drawings, variable speed conveyer means 8 is provided by an enclosed feed auger. The auger conveys the dried particle feedstock 1 to enclosed bucket elevator 9. From the elevated position at the top of elevator 9, the dried rubber particle feedstock 1 is discharged into a precooling means. Precooling means, in a preferred embodiment, is a precooler 10. Precooler 10 is equipped with means for controlling duration of rubber particle throughput and volume and temperature of coolant gas employed in precooling the feedstock 1.

The precooler 10, in a preferred embodiment, is provided with baffles 13 which slow and thus increase the duration of exposure of the rubber particle feedstock 1 therein. A coolant, an inert gas maintained at a temperature of no higher than about 0° F., is introduced into the precooler 10 by means of conduit 12. Preferably, the temperature of the inert gas is in the range of between about 0° F. and about –20° F. Still more preferably, the inert gas coolant is at a temperature of about –10F.

The term "inert gas" means a gas that does not interact with the rubber particles. Specifically, the inert gas is one that does not chemically react with the rubber particles. All noble gases, such as helium, neon, argon and the like, fall in the class of inert gases within the contemplation of the present invention. However, nitrogen, which is also chemically inert when contacted with rubber particles, is particularly preferred. This preferability is based on its lower cost and easy availability.

The inert gas coolant is introduced into the precooler 10 by means of conduit 12. The volumetric flow rate of the inert gas coolant is controlled by control valve 34. This rate, as well as the coolant gas temperature, defines the cooling capacity of the inert gas. The volumetric rate, and thus the degree of cooling, is adjusted as a function of the particle size range of the rubber charge. The larger the particle size, the greater the volumetric flow rate and/or the lower the temperature, since greater comminution is required.

The precooled particles exiting precooler 10, controlled by a control means such as a rotary valve 24 are thereupon introduced into a freezing means. Freezing means are provided in a feedstock freezer 14. The precooled rubber particle feedstock 1 is chilled in freezer 14 to a temperature below the glass transition temperature of the rubber particle feedstock by means of a cryogenic liquid. The cryogenic liquid is a liquid, which becomes the inert gas coolant, does not chemically react with the rubber particles. Again, liquid nitrogen is preferred as the cryogenic liquid for the same reason that prompts the preferred use of gaseous nitrogen as the inert gas coolant in the precooler. Liquid neon, helium, argon and other noble gas liquids may be alternately employed.

In view of the operation of the process and apparatus of the present invention, infra, the same coolant is employed as the precooler inert gas and the feedstock freezer cryogenic liquid. As stated above, the preferred precooler inert gas coolant is gaseous nitrogen and the feedstock freezer cryogenic liquid is liquid nitrogen.

The cryogenic liquid is supplied from a canister, vessel, tank or other container 15 at a controllable rate of flow, e.g. control valve 17, through conduit 16 into freezer 14. The introduction may be by any means known in the art, such as by splitting into parallel conduits connected to spray nozzles, as illustrated in the drawings. Alternatively, a manifold or other means may be employed which insures even distribution of the cryogenic liquid in feedstock freezer 14.

The duration of contact of the rubber particle feedstock 1 in feedstock freezer 14 may be controlled by methods known in the art. Preferably, this duration is provided by variable speed conveyor means. In one preferred method, illustrated in the drawings, an auger 18, whose speed may be controlled, is employed. The frozen rubber particle feedstock 1 is fed, from the precooler 10, at upstream end of auger 18. The feedstock 1 moves downstream on auger 18 and removed therefrom at its downstream end.

The freezer 14 effectuates reduction of the feedstock rubber particles temperature to a temperature below the glass transition temperature. The glass transition temperature is the temperature below which the rubber loses its elastic properties and changes to an embrittled vitreous state. In this state the rubber is easily shattered and thus comminuted.

The embrittled rubber particle feedstock 1 is thereupon discharged from the feedstock freezer 14 into a comminuting device 20. The comminuting device 20 is provided with means that permits the degree of comminuting to vary with the average particle size of the incoming rubber particle feedstock 1. That is, means are provided to permit comminution of the rubber particle feedstock 1 to a particle size denoted as powder rubber, independent of initial average particle size of the rubber feedstock 1. The powder rubber has an average particle size not larger than 80 U.S. mesh. Preferably, powder rubber particles have an average particle size in the range of between about 80 and about 200 U.S. mesh.

Suffice it to say, the unique comminuting device 20 is described in detail in U.S. patent application Ser. No. 10/973,847, filed concurrently with the filing of the present application. That disclosure, incorporated herein by reference, includes a stationary outer casing having a conical shape. Disposed inside the casing is an impact rotor provided with a plurality of impact knives. The impact rotor, having a complementary conical shape, is accommodated with the outer casing proving a gap therebetween in the form of a conical annular space. The gap is adjustable by lifting or lowering the impact rotor. The impact rotor is provided with a variable frequency drive. Thus, the rotational speed of the rotor may be controlled. The combination of variation in the size of the gap and the rotational speed of the rotor results in variation in the degree of comminution.

The comminuting device 20 is furthermore provided with a coolant which is provided by two separate streams. The first stream is introduced into device 20 along with the frozen rubber particle feedstock 1. This stream is cold inert gas which is product of vaporization of the cryogenic liquid in the feedstock freezer 14. The vaporization results from the heat transfer from the feedstock particles which are reduced in temperature to below the glass transition point.

The second coolant stream is part of a recycle stream. That is, the inert gas coolant in the impact device 20 is drawn out of the impact device, along with the comminuted rubber parts, into a separation means, which is preferably a discharge cyclone 30. The means for drawing out the coolant is a blower 32. The gaseous overhead product, the inert gas coolant, is split, at splitter 33, into two streams at a rate controlled by valve 34. The impact device 20 action draws in the secondary coolant stream into the top of the impact device 20 and mixes with the infeed feedstock from freezer 14.

In a preferred embodiment this recycle stream is uniformly introduced into impact device 20 by means of a plurality of nozzles evenly distributed around the device 20. In one preferred embodiment four nozzles, disposed 90° from each other, are employed.

Optionally, a third coolant stream may be provided when the comminuting requirement is severe. In those cases a third stream 35 of a cryogenic liquid, preferably liquid nitrogen, is introduced to insure that the coolant streams into the comminuting device 20 is sufficient to maintain the feedstock 1 below the glass transition temperature.

The overall temperature of the coolant streams introduced into impact device 20 is below about −75° F. Preferably, this overall temperature is in the range of between about −90° F. and about −125° F. More preferably, this temperature is in the range of between about 95° F. and about −115° F. Still more preferably, the overall inert gas coolant temperature is about −100° F.

The volumetric flow, as well as the temperature, of the coolant inert gas streams provides a means of controlling the comminution rate in device 20 since the colder the rubber particles the greater the degree of comminution.

As indicated above, the comminuted feedstock 1, along with cooling inert gas, is next transported to a separation means, discharge cyclone 30. Therein, the feedstock particles, which are at a temperature in the range of about 0° F. and about −20° F., usually about −10° F., is separated, by centrifugal force, from cooling gas. In addition to separating the rubber solids from the coolant gas, the cyclone 30 also removes very fine particles, denoted as fines. This material, entrained with the coolant inert gas, is recycled, along with the inert gas coolant back into the precooler 10.

The bulk of the comminuted cold feedstock 1, at a temperature of about −10° F., is discharged into a particle warming means. Preferably, the particle warming means is a warmer 40. The warmer 40 is a conventional warming device such as a rotary or a jacked screw conveyor, gas fired or electric powered. The comminuted feedstock, now at a size categorized as powder rubber in the U.S. or powder flour in Europe, is discharged from the warmer 40 at ambient temperature and is thus in condition for separation and final handling.

The product comminuted rubber particles, now at a size in the range of powder rubber, is discharged from the warmer 40, and conveyed to the final steps wherein foreign materials are removed and the product is separated into discrete powder, rubber particle size ranges.

This conveyance of powder rubber must be carefully handled in order to avoid losses of the very minute sized particles. In a preferred embodiment conveyance of the product exiting the warmer 40 is by means of an aero-mechanical conveyance means 50. Briefly stated, such a conveyer moves fine particle solids in an enclosed tube to higher elevation. Due to the finess of the solid particles these particles are conveyed in gaseous suspension in the aforemention aero-mechanical conveyor means 50.

In a preferred embodiment, illustrated in the drawings, the fine particle powder rubber particles are coated with an anti-agglomeration agent, such as a fumed silica, to maintain the discreteness of the particles before loading the particles onto the aero-mechanical conveyance means 50. This step is denoted by reference numeral 51.

The product stream is thereupon processed to remove any foreign residual material that may have been present in the rubber particle feedstock. Insofar as a large percentage of the rubber particles is derived from tires, steel and fiber belting is removed. This is accomplished by exposure of the product stream of powder rubber to a drum magnet 52 to remove minute steel particles and other iron-containing materials. The iron-free product is thereupon introduced into a fiber separation unit 54 to remove fibers, such as nylon, rayon and other fibrous material. The fiber separation unit 54 is preferably a centrifugal separator. It is noted that unit 54 also offers additional blending of the fumed silica and rubber particles.

The product, free of non-rubber particles, is placed upon a vibratory pan conveyer 56 wherein the particles are separated into three products, which are fungible, e.g. the same. This separation is preformed for efficient screening. Screening occurs in product screener 60. Three identical screener, each a three deck screener 60 is utilized.

The three-deck screener employs a top, courser screener atop a bottom, finer screener. Three particle size products are thus produced in this operation. The first product is the "top deck product." This top deck product constitutes rubber particles that do not pass through the top courser screen. These particles have a particle size smaller than U.S. sieve size No. 40 but larger than U.S. sieve size No. 80, which is the usual courser size screen. This is a powder rubber product.

The second product stream is the rubber particles that pass through U.S. sieve size No. 80 but do not pass through the finer screen, U.S. sieve size No. 140. This is a fine rubber powder product.

The third and fourth product stream is the rubber particles that pass through the finer U.S. sieve size No. 140 screen. This is an ultra fine powder rubber product.

For screening flexibility and to accommodate customer specifications, deck sizes can be interchanged to produce custom product sizes, for example, −60+80 mesh, −100+120 mesh, −140+240 mesh, etc.

The above description and embodiments are provided to illustrate the scope and spirit of the present invention. This description and embodiments will make apparent to those skilled in the art other examples and embodiments. These other examples and embodiments are within the contemplation of the present invention. Therefore, the present invention should be limited only by the appended claims.

What is claimed is:

1. A process of making powder rubber comprising the steps of
   (a) drying preprocessed rubber particles;
   (b) precooling said dried rubber particles with an inert gas at a temperature not higher than about 0° F.;
   (c) freezing said rubber particles to a temperature below the glass transition temperature by contacting said particles with a cryogenic liquid;
   (d) comminuting said cooled rubber particles to a size in the range of crumb or powder rubber;
   (e) heating said cold comminuted rubber particles to ambient temperature; and
   (f) screening said comminuted rubber particles into desired powder rubber size ranges.

2. A process in accordance with claim 1 wherein said drying step (a) comprises contacting said rubber particles with combustion product gas maintained at a temperature range of between about 100° F. and about 200° F.

3. A process in accordance with claim 1 wherein said freezing step (c) involves contact with a cryogenic liquid.

4. A process in accordance with claim 1 wherein said comminuting step (d) is provided with variable means to accommodate different average particle sized cooled rubber particles.

5. A process in accordance with claim 1 wherein said comminuting step (d) is provided with a cooling agent provided by an inert gas whose source is said cryogenic liquid heated in said cooling step (c).

6. A process in accordance with claim 5 wherein said inert gas cooling agent is at a temperature in the range of between about −90° F. and about −125° F.

7. A process in accordance with claim 1 wherein said comminuting step (d) includes introduction of a cryogenic liquid.

8. A process in accordance with claim 1 wherein said preprocessed rubber particles have an average particle size such that they pass through a U.S. sieve size of ⅜ inch but do not pass through 40 mesh.

9. A process for making powder rubber comprising the steps of:
   (a) drying preprocessed rubber particles having a particle size in the range of between about −⅜ inch and about +40 mesh;
   (b) precooling said dried rubber particles with a coolant nitrogen gas recycle stream at a temperature in the range of between about 0° F. and about −200° F.;
   (c) freezing said precooled rubber particles to below the glass transition temperature of said rubber by contact and exposure to liquid nitrogen wherein said liquid nitrogen is heated to gaseous nitrogen;
   (d) comminuting said rubber particles below the glass transition temperature in the presence of said gaseous nitrogen, and a coolant nitrogen gas recycle system;
   (e) recycling said nitrogen gas, generated in said freezing step (c), to said precooling step (b) and said comminuting step (d);
   (f) warming said comminuting rubber particles to ambient temperature; and
   (g) screening said ambient temperature comminuted rubber particles into desired powder rubber size ranges.

10. A process in accordance with claim 9 comprising the step of introducing a source of nitrogen liquid during said comminuting step (d).

11. An apparatus for making powder rubber comprising:
   (a) drying means for drying a feedstock of preprocessed rubber particles;
   (b) precooling means for precooling said dried rubber particles with inert gas at a temperature no higher than about 0° F.
   (c) freezing means for cooling said precooled rubber particles to a temperature below the glass transition temperature;
   (d) comminuting means for comminuting said rubber particles below the glass transition temperature to a size in the range of powder rubber;
   (e) warming means for warming said comminuted rubber particles to ambient temperature; and
   (f) screening means for providing said comminuting rubber particles in fine powder rubber size ranges.

12. An apparatus in accordance with claim 11 wherein said drying means comprises means for heating said feedstock of preprocessed rubber particles with combustion gases at a temperature in the range of between about 100° F. and about 200° F.

13. An apparatus in accordance with claim 11 wherein said comminuting means is provided with means for introduction of an inert gas coolant therein at a temperature in en the range of between about −90° F. and about −125° F.

14. An apparatus in accordance with claim 13 wherein said coolant gas recycle means provides inert gas as the vaporization product of said cryogenic liquid and said inert gas is recycled to said precooling means and said comminuting means from a discharge cyclone disposed downstream of said comminution means.

15. An apparatus in accordance with claim 13 comprising separating means, disposed downstream of said comminuting means and upstream of said heating means, for separating said rubber particle and said inert gas.

16. An apparatus in accordance with claim 11 comprising cooling fluid recycle means including a source of a cryogenic liquid introduced into said freezing means; a conduit for providing transport of said rubber particles between said freezing means and said comminuting means; a conduit for providing transport of said product of said comminuting means to said separating means; and a conduit providing inert gas communication between said separation means to both said precooling means and said comminuting means.

17. An apparatus in accordance with claim 11 wherein said drying means is a fluidized bed dryer heated by combustion gas in the range of between about 100° F. and about 200° F.

18. An apparatus in accordance with claim 11 wherein said precooling means is provided by a vertically disposed vessel provided with baffles into which an inert gas at a temperature in the range of between about 0° F. and about −20° F. is introduced.

19. An apparatus in accordance with claim 11 wherein said warming means is provided by a warmer wherein said comminuted rubber particles are warmed to ambient temperature.

20. An apparatus in accordance with claim 11 wherein said inert gas is gaseous nitrogen.

21. An apparatus in accordance with claim 11 wherein said freezing means includes contact of said precooled rubber particles with uniformly sprayed liquid nitrogen.

22. An apparatus for making powder rubber comprising:
(a) drying means for drying a feedstock of rubber particles in a size range of about −⅜ inch and about +40 mesh;
(b) precooling means for precooling said dried feedstock with a coolant inert gas recycle stream at a temperature in the range of between about 0° F. and about −20° F.;
(c) freezing means for cooling said precooled feedstock to a temperature below the gas transition temperature of said rubber particles by contact and exposure to liquid nitrogen;
(d) comminuting means for comminuting said cooled feedstock to a particle size no greater than about −80 mesh in the presence of a coolant at a temperature in the range of about −90° F. and about −125° F.;
(e) recycling means for recycling said gaseous nitrogen, vaporized from said liquid nitrogen in said freezing means, from said comminuting means back into said precooling means and said comminuting means;
(f) warming said comminuted feedstock exiting said comminuting means; and
(g) screening said comminuted feedstock into desired powder rubber size ranges.

23. An apparatus in accordance with claim 22 including liquid nitrogen introduction means for introducing liquid nitrogen into said comminuting means.

* * * * *